United States Patent
Hosokawa et al.

[11] Patent Number: 5,245,374
[45] Date of Patent: Sep. 14, 1993

[54] CAMERA HAVING STROBE INCORPORATED THEREIN

[75] Inventors: Tetsuo Hosokawa; Takehiro Ishino, both of Tokyo, Japan

[73] Assignee: Asahi Kogaku Kogyo Kabushiki Kaisha, Tokyo, Japan

[21] Appl. No.: 801,902

[22] Filed: Dec. 3, 1991

[30] Foreign Application Priority Data

| Dec. 4, 1990 | [JP] | Japan | 2-401525[U] |
| Dec. 4, 1990 | [JP] | Japan | 2-401526[U] |
| Dec. 18, 1990 | [JP] | Japan | 2-406461[U] |
| Mar. 19, 1991 | [JP] | Japan | 3-23727[U] |

[51] Int. Cl.⁵ ............................................. G03B 15/03
[52] U.S. Cl. .................................................. 354/149.11
[58] Field of Search ............... 354/127.1, 145.1, 149.1, 354/149.11

[56] References Cited

U.S. PATENT DOCUMENTS

| 4,847,647 | 7/1989 | Ueda | 354/149.1 |
| 4,893,140 | 1/1990 | Yamamoto et al. | 354/149.11 |
| 4,910,542 | 3/1990 | Yamamoto et al. | 354/149.11 |
| 4,951,074 | 8/1990 | Ueda | 354/149.1 |
| 5,028,949 | 7/1991 | Kawano | 354/403 |
| 5,055,866 | 10/1991 | Takebayashi | 354/149.1 |
| 5,079,574 | 1/1992 | Ueno | 354/149.11 |
| 5,134,433 | 7/1992 | Takami et al. | 354/149.11 X |

FOREIGN PATENT DOCUMENTS 2221765 2/1990 United Kingdom .

Primary Examiner—Michael L. Gellner
Assistant Examiner—Howard B. Blankenship
Attorney, Agent, or Firm—Sandler, Greenblum & Bernstein

[57] ABSTRACT

A camera having a built-in strobe is provided in which a light emitter is moved between a retracted position and a light emitting position, and includes at least one posture control pin that projects outward from at least one side of the light emitter. A support has at least one cam groove, in which the posture control pin is fitted, to control the posture of the light emitter. An elastic biasing member acts on a projecting end of the posture control pin to bias the light emitter into the light emitting position.

29 Claims, 12 Drawing Sheets

CAMERA HAVING STROBE INCORPORATED THEREIN

BACKGROUND OF THE INVENTION

1. Field of the Invention

The present invention relates to a camera having a strobe incorporated therein, and more precisely, it relates to a built-in strobe of a camera having a light emitter which is movable between an operative position and an inoperative (or retracted) position.

2. Description of Related Art

In a known single lens reflex camera having a strobe incorporated therein, a light emitter of the strobe is usually provided on a pentagonal prism, so as to move between an operative position (i.e., a light emitting or projected position) i.e., a and an inoperative position (retracted position). To hold the light emitter in the operative position, it is necessary to provide a special member, such as an elastic member (e.g., a spring), which biases the light emitter towards the operative position. The location of the elastic member between the light emitter and support thereof results in an unnecessarily wide strobe assembly, and accordingly, a wide camera body.

Furthermore, in a conventional strobe, the elastic member (spring) is engaged at its one end by an additional engaging member that is mounted to the light emitter. However, the provision of such an engaging member increases the number of camera components and complicates the assembly thereof.

When the strobe is used, the light emitter is moved to the operative position (light emitting position). If light is emitted from a light emitter which does not reach the operative position, an irregular photograph will likely result. To prevent this, a detection switch means which is turned OFF and ON when the light emitter is moved into and out of the retracted position, respectively, is provided to detect the position of the light emitter. In a known detection switch means, as shown in FIGS. 14A and 14B, a detection switch 74 is turned OFF by a switch pin 73 which is depressed by an operating member 72 provided on light emitter 71 of the strobe when the latter is in a retracted position. Conversely, when the light emitter 71 is in the operative position, the operating member 72 is disengaged from ,:the switch pin 73 to turn the detection switch 74 ON (FIGS. 16A and 16B).

However, in the known detection switch means mentioned above, the operating member 72 is disengaged from the switch pin 73 as soon as a light emitter 71 is moved from the retracted position toward the operative position, as shown in FIGS. 15A and 15B. Thus, the detection switch 74 is turned ON even when the light emitter 71 does not reach the operative position, or the vicinity thereof. Accordingly, the light emitter 71 which is not in the operative position emits strobe light, resulting in abnormal photographing. This occurs, for example, when the light emitter 71 comes into contact with an external strobe mounted to an accessory shoe for some reason, or a photographer's finger interferes with the movement of the light emitter 71.

It is also known to provide an LCD panel which indicates the states of various camera functions, such as the number of remaining film frames, set modes, etc., in a single lens reflex camera having a strobe incorporated therein. Since the LCD panel itself emits no light, it is necessary to provide a lighting device which is activated when an actuation button is manually actuated, so that information indicated in the LCD panel is visible even in the dark.

However, the presence of the manually actuated lighting button increases the number of buttons which must be manually actuated by a photographer, and thus, results in a complicated operation of the camera. It is theoretically possible to use one of the existing buttons of the camera as a manually actuated lighting button. However, this complicates the operation and increases the possibility of mis-operation.

An automatic lighting system is also known, in which a brightness is detected and compared with a predetermined reference value, and if the detected brightness is below the reference value, the lighting is automatically carried out. In this system, however, at least one detection of the brightness followed by the comparison with the reference value must be effected to determine whether the lighting is necessary, and accordingly, the mechanical and electronical detection and control systems become complicated.

SUMMARY OF THE INVENTION

The primary object of the present invention is to eliminate the aforementioned drawbacks by providing a small and simple built-in strobe of a camera having a small width.

To achieve the object mentioned above, according to the present invention, there is provided a built-in strobe for a camera, having a light emitter which is moved between a retracted position and a light emitting position, comprising at least one posture control pin that projects outward from at least one side of the light emitter, a supporting means that includes at least one cam groove in which the posture control pin is fitted, so as to control the posture of the light emitter, the posture control pin projecting at one end thereof from the cam groove, and an elastic biasing means that acts on the projecting end of the posture control pin for biasing the light emitter into the light emitting position.

Another object of the present invention is to provide a camera having a built-in strobe in which means for biasing a light emitter can be engaged by an engaging means having few components. To achieve this object, according to another aspect of the present invention, a camera having a built-in strobe has a light emitter which is moved between a retracted position and a light emitting position, comprises at least one posture control pin that is provided on at least one side of the light emitter to project outward therefrom, a supporting means that includes at least one cam groove in which the posture control pin is fitted so as to restrict the posture of the light emitter, an elastic biasing means that acts on the projecting end of the posture control pin to bias the light emitter into the light emitting position, and an engaging means on the projecting end of the posture control pin for restricting the movement of one end of the elastic biasing means in the axial direction of the posture control pin.

Still another object of the present invention is to provide a camera having a built-in strobe which can detect that a light emitter is in a light emitting position in which the light emitter correctly emits strobe light.

To achieve this object, according to another aspect of the present invention, there is provided a camera having a built-in strobe that has a light emitter which is moved between a retracted position and a light emitting position, comprising means for supporting the light emitter to move between the light emitting position and the retracted position, and a detection switch means which is selectively turned ON and OFF when the light emitter is and not in the light emitting position, respectively, so as to detect the position of the light emitter.

Preferably, the light emitter is supported by a supporting means having a pair of supporting arms which are engaged at on end thereof by the light emitter and at the other end by the camera body, through respective shafts, to move between the light emitting position and the retracted position.

The detection switch means comprise a switch pin which is mounted to the camera body so as to move in a direction that is parallel with the axis of the supporting arms, and a contact assembly having a movable contact which abuts against one end of the switch pin to selectively turn the detection switch means ON and OFF in accordance with the movement of the switch pin. The switch pin is camera into sliding contact with a side face of the associated supporting arm during the movement of the light emitter from the retracted position to a predetermined position immediately before the light emitting position to turn the detection switch means OFF. On the other hand, when the light emitter is in the light emitting position, the switch pin is separated from the side face of the associated supporting arm to turn the detection switch means ON.

Still another object of the present invention is to provide a camera having an indicator which can be illuminated in accordance with need.

To this end, a camera including a strobe incorporated therein having a light emitter which is moved between a retracted position and a light emitting position, and means for indicating various functions of the camera, according to the present invention, comprises means for detecting a position of the light emitter, means for illuminating the indicating means, and means for activating the illumination means to illuminate the indication means when the detecting means detects that the light emitter is in the light emitting position.

The present disclosure relates to subject matter contained in Japanese Utility Model Applications Nos. HEI2-401525 and HEI2-401526 (both of which were filed on Dec. 4, 1990); No HEI2-406461 (filed on Dec. 18, 1990) and No. HEI3-23727 (which was filed on Mar. 19, 1991) which are expressly incorporated herein by reference in its entirety.

BRIEF DESCRIPTION OF THE DRAWINGS

The present invention will be described below in detail with reference to the accompanying drawings, in which.

DESCRIPTION OF THE PREFERRED EMBODIMENTS

Figure 1:
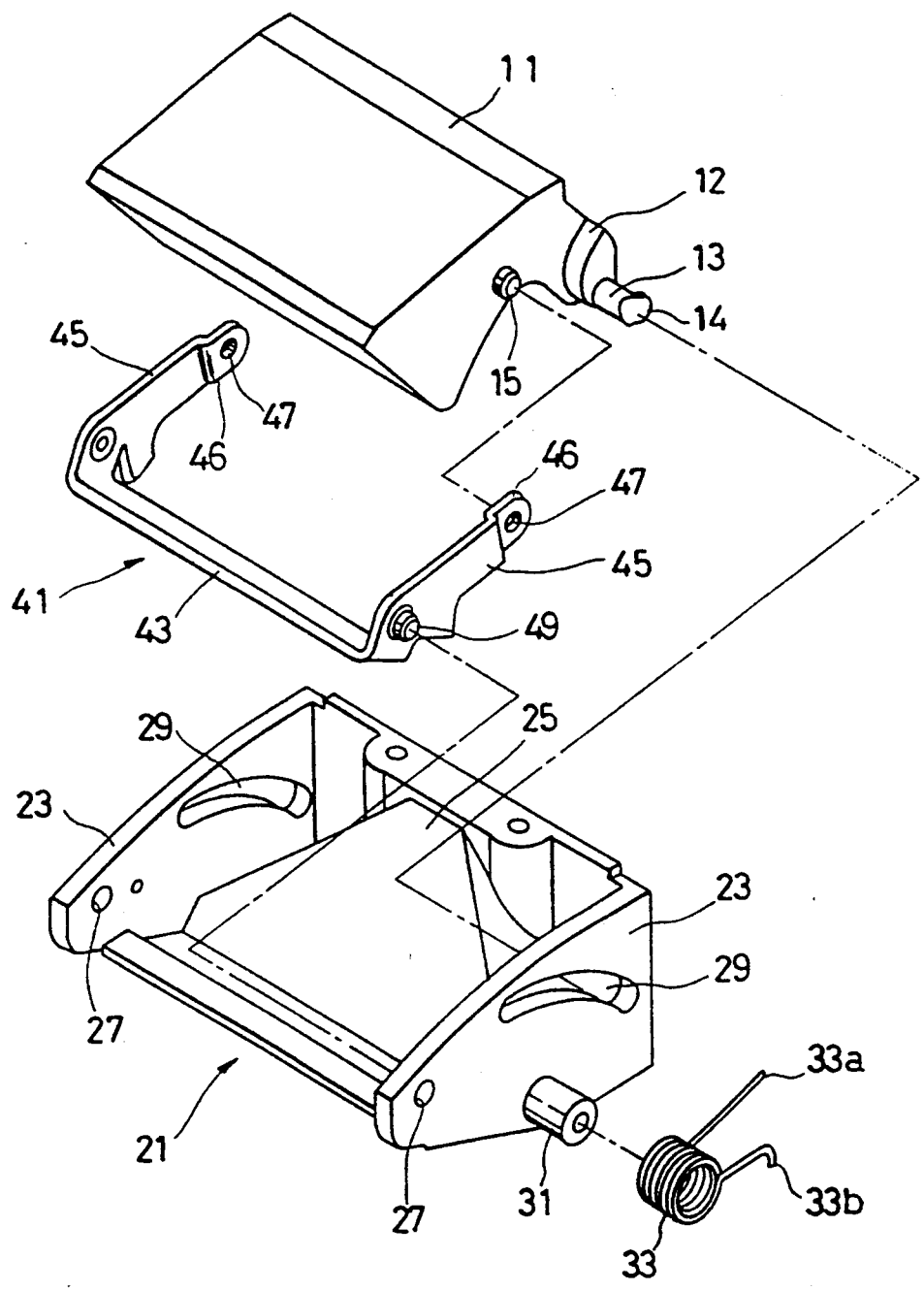
FIG. 1 is an exploded perspective view of a main part of a strobe according to a first embodiment of the present invention.

The invention will be described below with reference to embodiments illustrated in the drawings.

Figure 2:
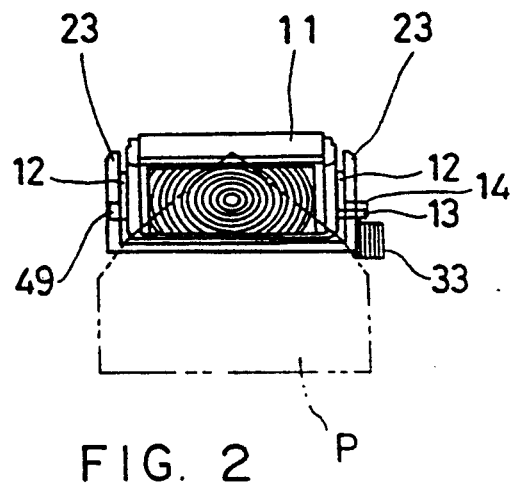
FIG. 2 is a front elevational view of a main part of the strobe shown in FIG. 1 and mounted to a single lens reflex camera.

A support 21 for supporting a light emitter 11 has a pair of parallel supporting plates (e.g., side plate) 23 that are spaced apart from one another by a predetermined distance, and a prism receiving portion 25 that is integral therewith, in which a pentagonal prism P (see FIG. 2) is received and secured.

Each of the side plates 23 is provided with a shaft hole 27 and an arched cam groove 29. One of the side plates 23 is provided on its outer side face with a spring shaft 31 that is integral therewith, to which a torsion coil spring 33 (e.g., an elastic member) is mounted. The cam grooves 29 allow the light emitter 11 to move between a retracted position (e.g., inoperative position) and an operative position (light emitting position). The cam grooves 29 also hold the light emitter 11 in two respective postures corresponding to the retracted or operative position. The torsion coil spring 33 is engaged at its one end 33a by the light emitter 11 (e.g., a posture control pin 13) and at the other end 33b by an engaging portion 50 formed on a camera body, respectively, so that the light emitter 11 is continuously biased towards the light emitting position by the torsion coil spring 33.

The spring shaft 31 is formed in the vicinity of a center of curvature of the cam groove 29.

The light emitter 11 is provided, on the rear portions of the side faces thereof, with the posture control pins 13 which project outward to be fitted in the corresponding cam grooves 29 of the support 21 (only one posture control pin 13 is shown in FIG. 1). The posture control pins 13 have at base portions thereof stepped portions 12 of a larger diameter. One of the posture control pins 13 is provided on its front end with a projection 14 which restricts the thrust movement of the torsion coil spring 33 to prevent the end 33a of the torsion coil spring 33 from being disengaged from the associated posture control pin 13. Projection 14 is shaped and sized so that there is at least one specific angular position at which the projection 14 can be inserted.

The light emitter 11 is provided on the outer side faces thereof with supporting shafts 15 which outwardly project. The light emitter 11 is supported so as to move between the retracted position and the light emitting position by the supporting shafts 15 and the posture control pins 13.

A generally U-shaped association member 41 has a pair of supporting arms 45 integrally connected to each other through a connecting web 43. The supporting arms 45 are spaced apart from one another so as to be fitted in the spaces between the side faces of the light emitter 11 and the associated supporting plates 23. The supporting arms 45 have stepped rear ends 46 which are spaced apart from one another by a distance (width) that is smaller than the distance (width) of the supporting arms 45. The rear ends 46 of the supporting arms 45 are provided with shaft holes 47 in which the supporting shafts 15 of the light emitter 11 are fitted. The supporting arms 45 are also provided with pivot shafts 49 provided on the outer wall surfaces thereof adjacent to the connecting web 43. The pivot shafts 49 (only one pivot shaft 49 is shown in FIG. 1) can then be fitted in the associated shaft holes 27 of the supporting plates 23 from the inside thereof.

The light emitter 11, the support 21 and the association member 41 are assembled as follows.

One of the posture control pins 13 that has the projection 14 is first inserted through the associated cam groove 29. Then, the other posture control pin 13 is fitted in the other cam groove 29. Thereafter, the pivot shafts 49 of the association member 41 are inserted in the corresponding shaft holes 27 of the support 21. Finally, the shafts 15 of the light emitter 11 are fitted in the shaft holes 47 of the association member 41. It is possible to mount the association member 41 to the light emitter 11 prior to the attachment of the light emitter 11 to the support 21.

Support 21 is then put on the pentagonal prism P and secured to the camera body by machine screws or the like. Torsion coil spring 33 is fitted on the spring shaft 31. Ends 33a and 33b of the torsion coil spring 33 are engaged by the posture control pin 13 and the engaging portion 50 of the camera body, respectively. The assembly of the main elements is thus completed.

The following discussion will be directed to the operation of the light emitter 11 which moves between the retracted position and the light emitting position.

Figure 3:
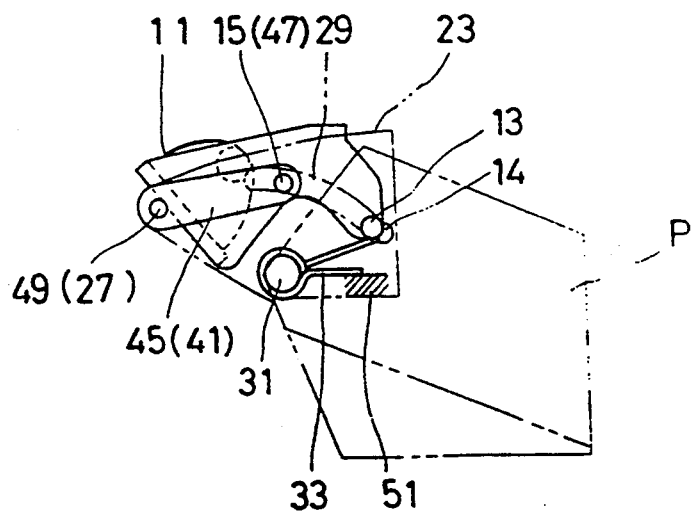
FIG. 3 is a side elevational view of a main part of the strobe of FIG. 1 shown in a retracted position.
Figure 4:
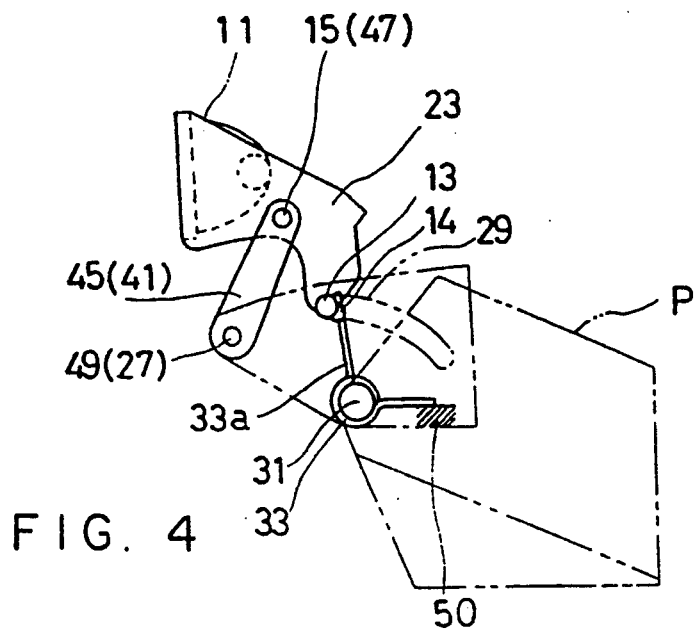
FIG. 4 is a side elevational view of a main part of the strobe of FIG. 1 shown in an operative position.

The retracted position and the light emitting position of the light emitter (strobe) are shown in FIGS. 3 and 4, respectively.

The light emitter 11 is held by a lock means (not shown) in the retracted position against the spring force (bias) of the torsion coil spring 33. When the lock is released, the posture control pins 13, and accordingly, the light emitter 11 are moved along the cam grooves 29 by the spring force of the torsion coil spring 33. Since the light emitter 11 is connected to the supporting plates 23 through the shaft holes 47 of the supporting arms 45 in which the shafts 15 are fitted, the light emitter 11 is restricted by the supporting arms 45 and the cam grooves 29 and is moved along a predetermined track to the light emitting position while the stepped portions 12 slide on the inner side faces of the associated supporting plates 23, as shown in FIG. 4. In the light emitting position, the light emitter 11 is held by the biasing force of the torsion coil spring 33, in which the posture control pins 13 come into contact, at the ends of the corresponding cam grooves 29.

The movement of the light emitter 11 from the light emitting position to the retracted position is manually effected by a photographer. Namely, the photographer depresses the roof portion of the light emitter 11 against the spring force of the torsion coil spring 33. Consequently, the light emitter 11 is moved to the retracted position along a predetermined track defined by the supporting arms 45, the posture control pins 13 and the cam grooves 29 and is locked by a lock means (not shown) in the retracted position.

Figure 5:
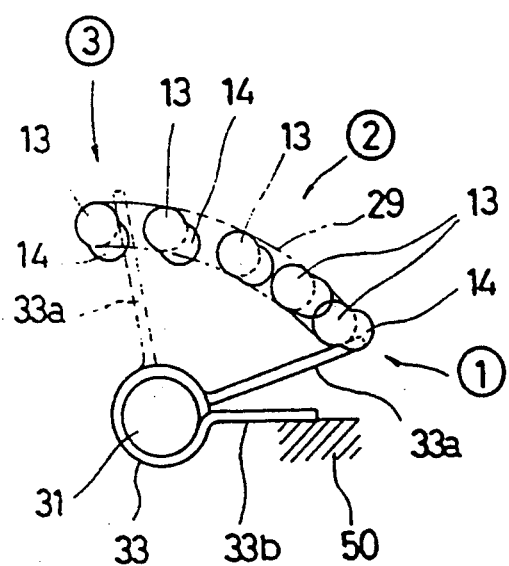
FIG. 5 is an explanatory view of a spring member for biasing a light emitter shown in FIG. 1.

The relationship between the torsion coil spring 33, the posture control pins 13, the engaging portion 50, and the cam grooves 29 during the movement of the light emitter 11 between the retracted position and the light emitting position will be explained below in detail with reference to FIG. 5.

When the posture control pins 13 (light emitter 11) are in retracted position ①, the engaging projection 14 extends beyond the end of the associated cam groove 29 and prevents end 33a of the torsion coil spring 33 from moving in the axial direction of the shaft 31.

When the posture control, pins 13 are moved from retracted position ① towards the light emitting position ③ along the cam grooves 29, the engaging projection 14 rotates such that the profile of the engaging projection 14 is moved within the boundary of the associated cam groove 29 profile at an intermediate position ② between the retracted position ① and the light emitting position ③. Intermediate position ② defines the specific angular position at which the posture control pin 13, having the engaging projection 14, can be inserted through the associated cam groove 29.

During the movement of the posture control pin 13 from the intermediate position ② towards the light emitting position ③, the engaging projection 14 prevents the movement of the end 33a of the torsion coil spring 33 in the axial direction, so that no accidental detachment of end 33a from the posture control pin 13 occurs. The posture control pins 13 are moved from the light emitting position ③ towards the retracted position ① in the opposite direction along the same track.

As can be seen from the foregoing, according to the present invention, since the end of the posture control pin 13, with which end 33a of the torsion coil spring 33 for biasing the light emitter 11 towards the light emitting position comes into contact, projects from the cam groove 29 and is provided with the engaging projection 14, end 33a can be brought into sliding contact with the posture control pin 13, but cannot be moved in the axial direction of the posture, control pin 13 by the engaging projection 14. End 33a of the torsion coil spring 33 is thereby prevented from disengaging from the posture control pin 13. In addition to the foregoing, since the torsion coil spring 33 is located outside the associated supporting plate 23, it is not necessary to provide a space for accommodating the torsion coil spring 33 between the supporting plates 23 and the light emitter 11, resulting in a reduced width of the support 21, and accordingly, a smaller strobe assembly.

Although the accidental detachment prevention means of the torsion coil spring 33 is constituted by the engaging projection 14 provided on the end of the associated posture control pin 13 in the illustrated embodiment, the engaging projection 14 can be replaced with a groove provided on the associated posture control pin 13, so that the end of the torsion coil spring 33 can be engaged.

Alternatively, it is possible to provide a pair of torsion coil springs 33 on the opposite outer side faces of the side plates (supporting plates) 23. In this alternative, the spring shafts 31 are provided on the side plates 23, so that the torsion coil springs 33 are mounted to the spring shafts 31. Needless to say, in this alternative, the engaging projections 14 are provided on both of the posture control pins 13. In this alternative arrangement, the light emitter 11 is uniformly biased by the torsion coil springs 33 on the opposite sides thereof.

As can be understood from the above discussion, according to the present invention, since the light emitter 11 is biased by the torsion coil spring or springs 33 provided on one or both of the outer side faces of the supporting plates 23, the distance between the supporting plates 23 can be reduced, resulting in a miniaturization of the light emitter.

Figure 6:
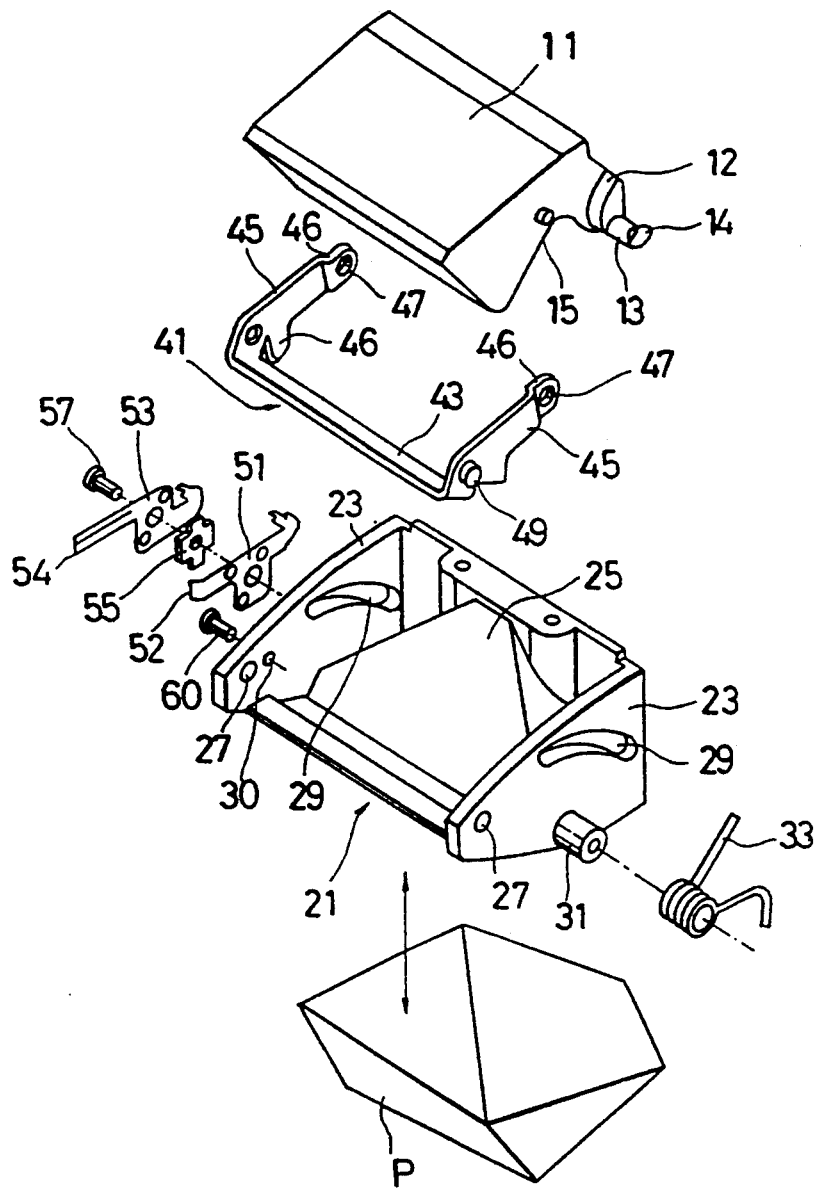
FIG. 6 is an exploded perspective view of a main part of a strobe according to a second embodiment of the present invention.

FIG. 6 shows another embodiment of the present invention, in which a detection means is additionally provided in the light emitter 11 to detect that the light emitter is in the light emitting position. The basic construction of the light emitter shown in FIG. 6 is the same as that of the first embodiment illustrated in FIGS. 1 through 5, and accordingly, the elements corresponding to those in the first embodiment are designated with the same reference numerals as those in FIGS. 1 through 5.

One of the supporting arms 45 is provided with an oblique surface portion 64 which is bent inward. One of the supporting plates 23, that corresponds to a supporting arm 45, has stationary and movable flexible contact plates 51 and 53, respectively. Both plates are made of an electrically conductive material and are insulated from one another by an insulator 55 and secured to the outer side face of the supporting plate 23 by a set screw 57. The stationary contact plate 51 has at its one end a stationary contact portion 52 which is convexly bent with respect to the contact plate 53. The movable contact plate 53 has a flexible movable contact portion 54 which is brought into contact with the stationary contact portion 52 at its front end, or the vicinity thereof. Due to the flexibility of the contact portion 54, an electrical connection can be established between the contact portions 52 and 54 when no external force is applied thereto, i.e., when they are in a free state.

One supporting plate 23 has a small hole 30 which is opposed to the front end of the movable contact portion 54 that extends beyond the stationary contact portion 52. In the small hole 30 is slidably inserted a switch pin 60 having an enlarged head 61 which can be brought into contact with the movable contact portion 54, and a free end 62 (See FIG. 7) which can be brought into slide-contact with the one supporting arm 45 and the oblique surface portion 64. The switch pin 60 is moved in an inoperative direction, (OFF direction) in which the free end 62 abuts against the outer side face of the associated supporting arm 45 and the head 61 projects outward when the light emitter 11 is in the retracted position (e.g., inoperative position) and in the intermediate position between the retracted position and the light emitting position. Conversely, when the light emitter 11 is in the light emitting position, the switch pin 60 is moved in an operative direction (ON direction) in which the free end 62 abuts against the oblique surface portion 64 and the head 61 is retracted.

Figure 11:
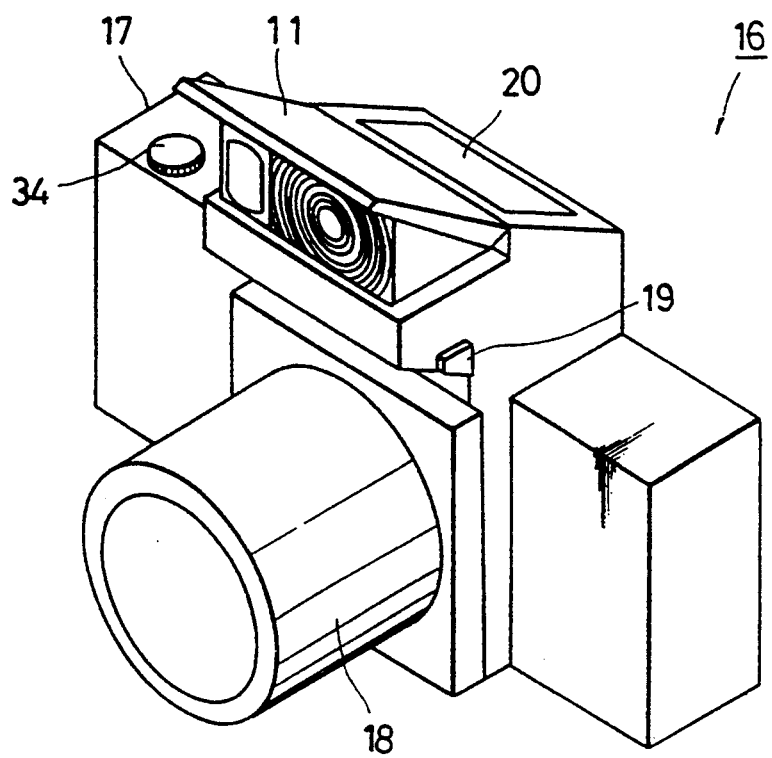
FIG. 11 is a perspective view of a single lens reflex camera having a strobe in a retracted position, according to the present invention.
Figure 12:
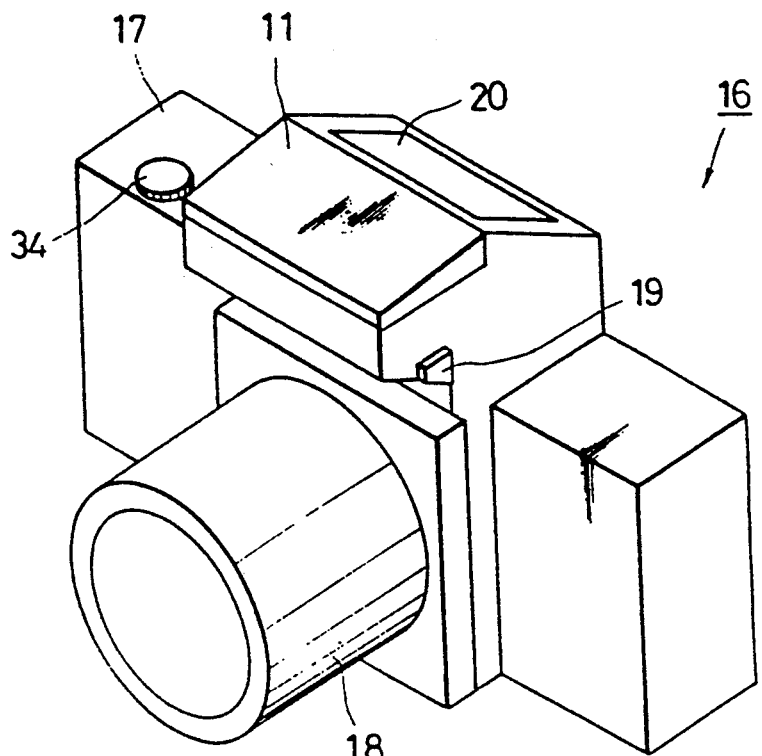
FIG. 12 is a perspective view of a single lens reflex camera having a strobe in an operative position, according to the present invention.

In a single lens reflex camera 16 having a strobe unit as mentioned above, the strobe light emitter 11 and an LCD panel 20 are provided on an upper center portion of a camera body 17, i.e., the pentagonal prism P, as shown in FIG. 11. A strobe-up button 19, which is provided on the side of the light emitter 11, is actuated to move the light emitter to the light emitting position. A shutter button 34 and a photographic lens barrel 18 are provided on the upper wall and front wall of the camera body 17, respectively.

Figure 13:
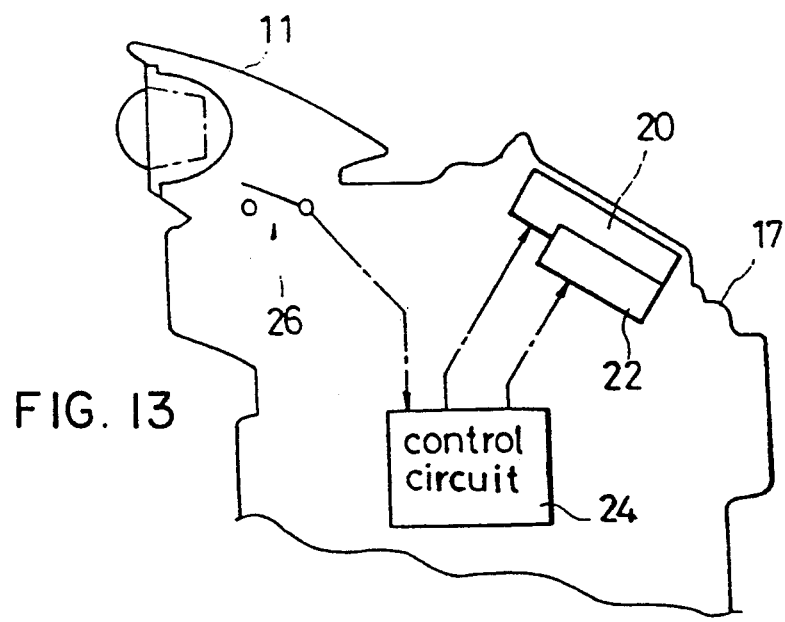
FIG. 13 is a schematic view of a light control system of an LCD panel of the camera shown in FIG. 12.
Figure 14A:
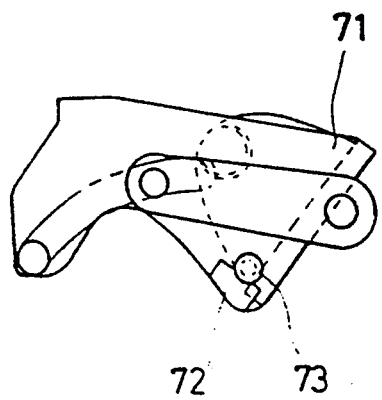
FIG. 14A is a front elevational view of a main part of a conventional built-in strobe in a retracted position.
Figure 14B:
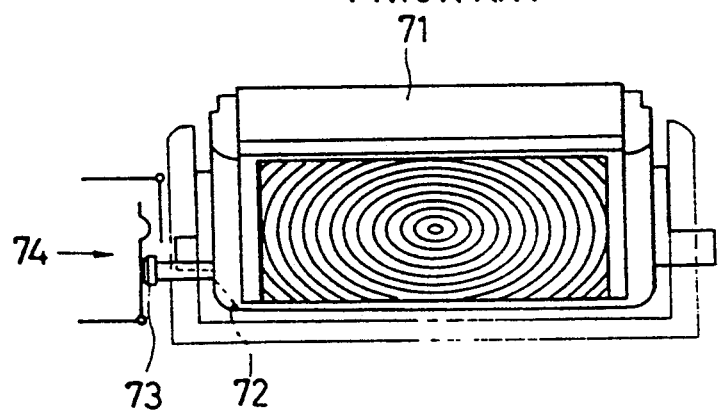
FIG. 14B is a side elevational view of a main part of a conventional built-in strobe in a retracted position.
Figure 15A:
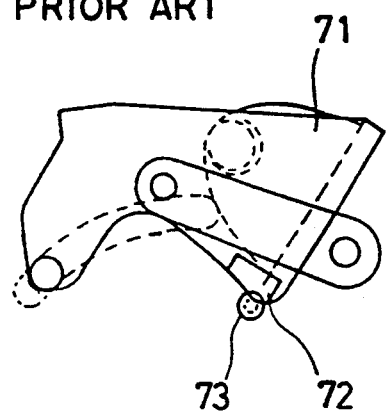
FIG. 15A is a front elevational view of a main part of a conventional built-in strobe, in which a light emitter is slightly moved from a retracted position toward an operative position.
Figure 15B:
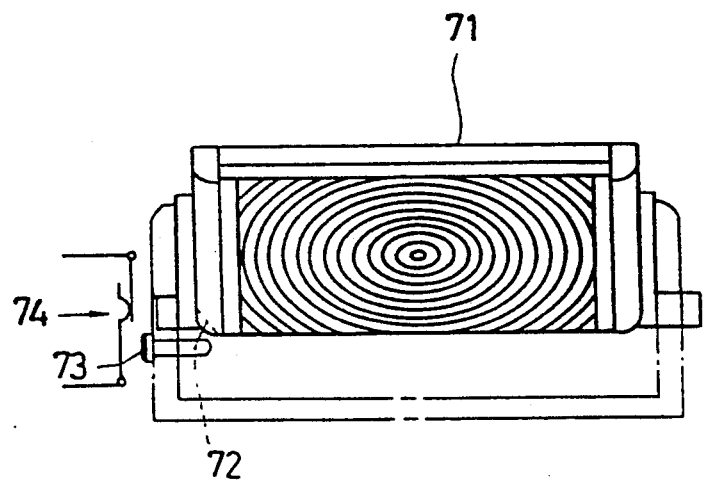
FIG. 15B is a side elevational view of a main part of a conventional built-in strobe, in which a light emitter is slightly moved from a retracted position towards an operative position.
Figure 16A:
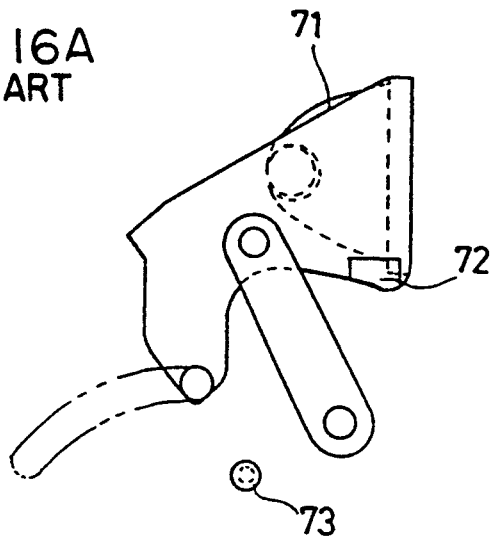
FIG. 16A is a front elevational view of a main part of a conventional built-in strobe in a light emitting position; and, FIG. 16B is a side elevational view of a main part of a conventional built-in strobe in a light emitting position.
Figure 16B:
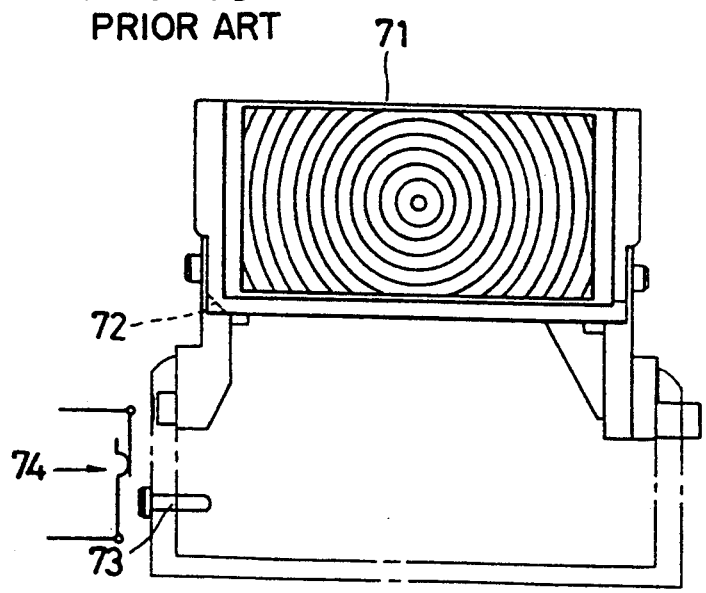

A lighting device (lighting means) 22 is provided in the camera body in the vicinity of the LCD panel 20 (FIG. 13) to illuminate the LCD panel 20. A controller 24 is provided in the camera body 17 to control the detecting means 26, the LCD panel 20 and the lighting device 22. The controller 24 detects the position of the light emitter 11 in accordance with the detection signal of the detection means 26 and outputs a lighting signal to the lighting device 22 when the light emitter 11 is moved to the light emitting position. The movable contact portion 54 then comes into contact with the stationary contact portion 52 to establish an electrical connection therebetween. Upon receipt of the lighting signal, the lighting device 22 illuminates the LCD panel 20.

Figure 7:
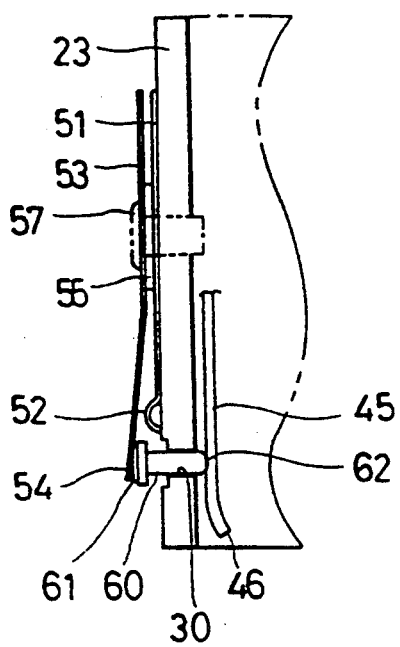
FIG. 7 is an enlarged view of a light emitter detecting switch means and surroundings thereof, shown in a retracted position.
Figure 8:
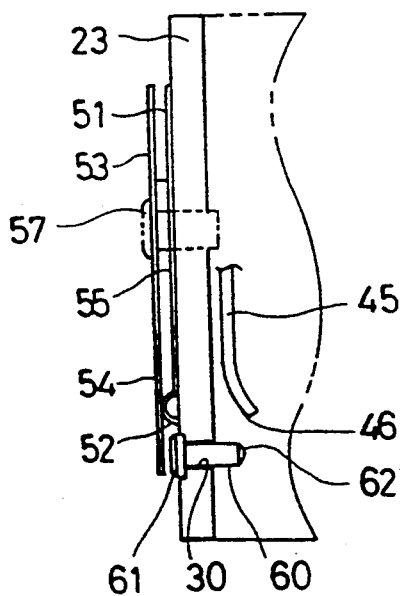
FIG. 8 is an enlarged view of a light emitter detecting switch means and surroundings thereof, shown in an operative position.
Figure 9A:
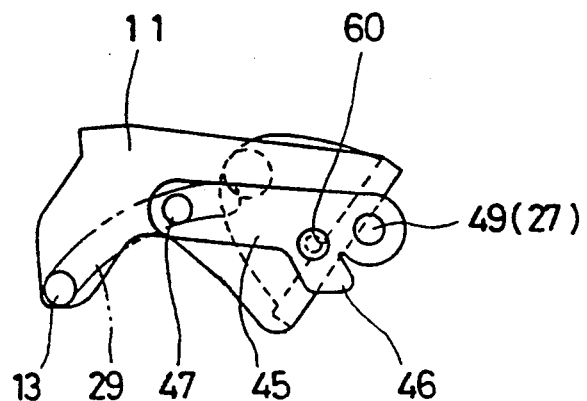
FIG. 9A is a front elevational view of a main part of the strobe of FIG. 6, shown in a retracted position.
Figure 9B:
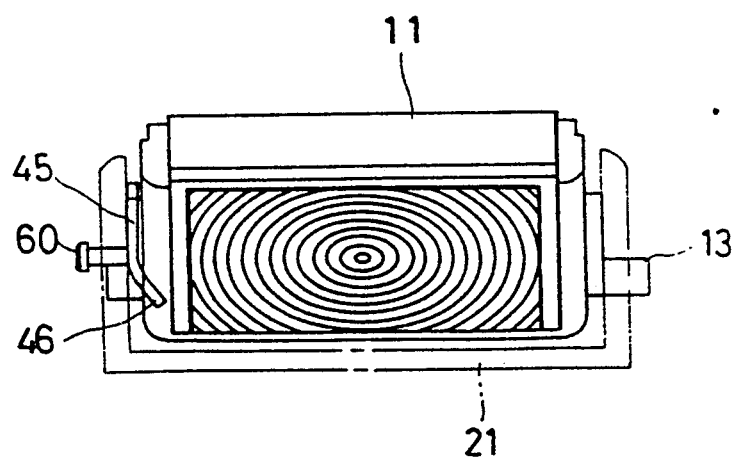
FIG. 9B is a side elevational view of a main part of the strobe of FIG. 6, shown in a retracted position.
Figure 10A:
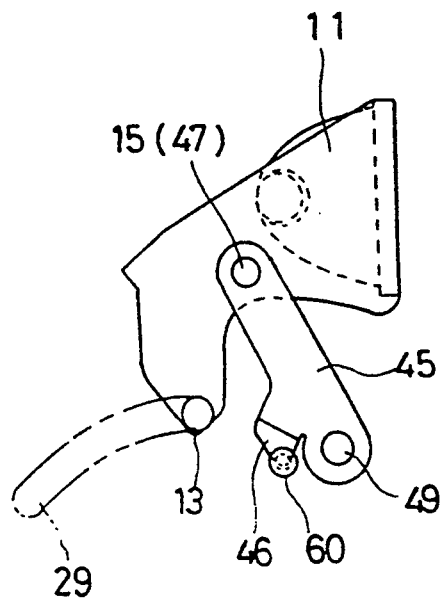
FIG. 10A is a front elevational view of a main part of the strobe of FIG. 6, shown in an operative position.
Figure 10B:
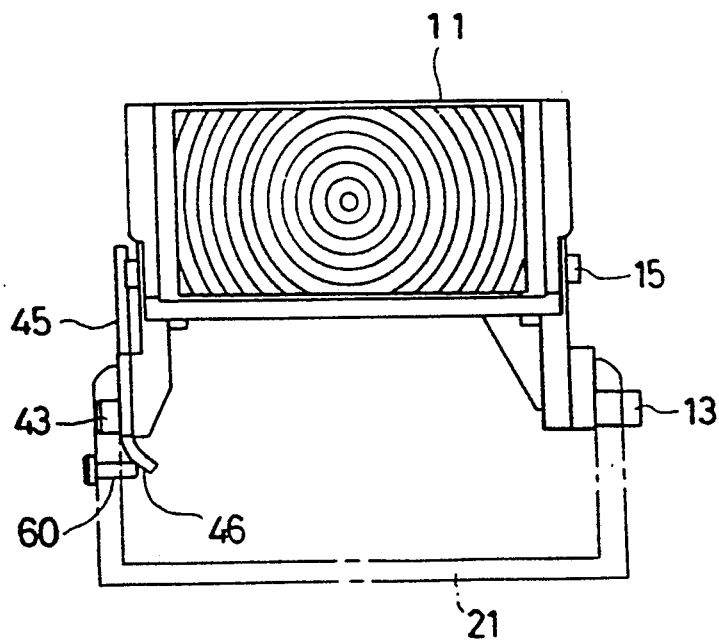
FIG. 10B is a side elevational view of a main part of the strobe of FIG. 6, shown in an operative position.

The operation when the light emitter 11 is moved between the retracted position and the light emitting position will be described below with reference to FIGS. 7 through 10B. FIGS. 7, 9A and 9B show the strobe in the retracted position and FIGS. 8, 10A and 10B show the light emitting position, respectively.

The light emitter 11 is locked in the retracted position by a lock means (not shown) against the biasing force of the torsion coil spring 33, as mentioned before. In the retracted position, the free end 62 of the switch pin 60 abuts against the outer side face of the associated supporting arm 45. Accordingly, the switch pin 60 projects in the ON direction, as mentioned above. Namely, the switch pin 60 forces the movable contact portion 54 away from the stationary contact portion to be in the OFF position.

When the light emitter 11 is unlocked, i.e., the lock means is released, the posture control pins 13 are moved in and along the cam grooves 29 by the spring force of the torsion coil spring 33. Since the light emitter 11 is connected to the supporting plates 23 through the shaft holes 47 of the supporting arms 45 in which the shafts 15 are fitted, the light emitter 11 is restricted by the supporting arms 45 and the cam grooves 29, so that the light emitter 11 is moved along a predetermined track while bringing the stepped portions 12 into slide contact with the inner surfaces of the supporting plates 23. When the supporting arms 45 rotate in accordance with the movement of the light emitter 11 toward the light emitting position, the outer side face of one of the supporting arms comes into slide contact with the free end 62 of the switch pin 60, and accordingly, the OFF state is maintained.

When the light emitter 11 comes close to the light emitting position, the oblique surface portion 64 of the associated supporting arm 45 comes into contact with the free end 62 of the switch pin 60, so that the latter can be moved in the ON direction. Consequently, the movable contact portion 54 moves the switch pin 60, due to the flexibility thereof, in the ON direction. In this position, switch pin 60 is near the stationary contact portion 52. As a result, the movable contact portion 54 comes into contact with the stationary contact portion 52 immediately before the light emitter 11 reaches the light emitting position. The ON state, i.e., the electrical connection between the movable contact portion 54 and the stationary contact portion 52 is maintained in the light emitting position (FIGS. 8, 10A and 10B).

When the electrical connection is established between the movable contact portion 54 and the stationary contact portion 52, the lighting device is activated to illuminate the LCD panel 20, so that information indicated on the LCD panel 20 becomes visible.

The movement of the light emitter 11 from the light emitting position to the retracted position is manually effected by a photographer, similar to the first embodiment. Namely, the photographer depresses the roof portion of the light emitter 11 against the spring force of the torsion coil spring 33. Consequently, the light emitter 11 is moved to the retracted position along a predetermined track defined by the supporting arms 45, the posture control pins 13 and the cam grooves 29. Since, when the light emitter 11 is slightly separated from the light emitting position, the switch pin 60 is forced in the OFF direction by the oblique surface portion 64 and the movable contact portion 54 is separated from the stationary contact portion 52. The separation of the movable contact portion 54 from the stationary contact portion 52 turns the detection means 26 OFF, so that the lighting device 22 is turned OFF by the controller 24 in accordance therewith. This state is maintained when the light emitter 11 is in the retracted position, as mentioned above.

As can be understood from the above discussion, according to the present invention, the movable contact portion 54 is brought into contact with the stationary contact portion 52 when the light emitter 11 is in the light emitting position, and is separated from the stationary contact portion 52 when a slight movement of the light emitter 11 from the light emitting position towards the retracted position takes place. The OFF state, i.e., the separation of the movable contact portion 54 from the stationary contact portion 52 is maintained as long as the light emitter is in a position between a critical position, corresponding to the slight movement mentioned above, and the retracted position. Namely, the movable contact portion 54 is in contact with the stationary contact portion 52 only when the light emitter 11 is in, or in the vicinity of, the light emitting position. Therefore, the light emitting position of the light emitter 11 can be precisely detected by the detection of the connection and disconnection of the movable contact portion 54 to and from the stationary contact portion 52. Consequently, the strobe incorporated in the camera can emit strobe light in a normal state.

Since the lighting device 22 illuminates the LCD panel 20 when the light emitter 11 comes to the light emitting position, a photographer can manually actuate the operation button, such as a mode selection button even in the dark. This simplifies the photographer's operation and reduces number of the operation buttons, resulting in a realization of a simple to use camera. When the light emitter 11 is not in the light emitting position, the lighting device 22 is automatically turned OFF. Accordingly, it is not necessary for a photographer to turn the lighting device 22 OFF. This eliminates a possible failure to extinguish the lighting device 22, and effectively decreases the power consumption.

Although the detection switch means is turned ON when the light emitter 11 is in the light emitting position, in the illustrated embodiments, it is possible to provide a detection switch means which is turned OFF when the light emitter 11 is in the light emitting position.

As can be seen from the foregoing, according to the present invention, since the light emitter is moved and biased by the spring means acting on the posture control pin (or pins) which control the posture of the light emitter during the movement thereof between the light emitting position, and the retracted position and which project from the associated cam groove (grooves), the construction can be simplified and the width of the strobe assembly can be reduced. Therefore, the strobe assembly can be incorporated in a smaller space of the camera without interfering with the pentagonal prism.

Furthermore, in a strobe having a spring member which engages with one of the posture control pins fitted in the cam grooves for guiding the movement of the light emitter between the retracted position and the light emitting position to continuously bias the posture control pins, since the detachment prevention member of the spring member is integrally provided on one end of the associated posture control pin to restrict the movement of the spring member in the axial direction, the manufacturing process can be simplified and the number of constituent elements can be reduced.

According to the present invention, since the detection means for detecting the position of the light emitter is provided and is selectively turned ON and OFF when the light emitter is or is not in the light emitting position or the vicinity thereof, it is possible to accurately detect that the light emitter is in the light emitting position (or the vicinity thereof) in which normal strobe light emission can be effected, resulting in the prevention of possible abnormal strobe light emission.

Furthermore, according to the present invention, since the lighting device is activated when the detection means detects the light emitter in the light emitting position, the indication means (LCD ,panel, is, automatically illuminated when the strobe is used. Accordingly, the operation, such as mode selection, can be easily carried out even in a dark place.

We claim:
1. A camera having a built-in strobe in which a light emitter is moved between a retracted position and a light emitting position, comprising:
    at least one posture control pin that projects outward from at least one side of said light emitter;
    means for supporting said light emitter, said supporting means including at least one cam groove in which said posture control pin is fitted to control a posture of said light emitter, said posture control pin projecting at one end thereof from said at least one cam groove; and, means for elastically biasing said light emitter, said biasing means acting directly on said projecting one end of said posture control pin for biasing said light emitter into said light emitting position.

2. The built-in strobe camera of claim 1, wherein said camera comprises a single lens reflex camera that has a pentagonal prism.

3. The built-in strobe camera of claim 2, wherein said light emitter is provided on said pentagonal prism.

4. The built-in strobe camera of claim 3, wherein said supporting means comprises a pair of side plates that support said light emitter.

5. The built-in strobe camera of claim 4, wherein said at least one cam groove is provided on one of said side plates.

6. The built-in strobe camera of claim 3, wherein said supporting means comprises a support having a pair of side plates that are located outside each side face of sad light emitter, and a pair of supporting arms which pivot at one end thereof with respect to said side plates and at the other end thereof with respect to said side faces of said light emitter through pivot shafts, said at least one cam groove being provided on one of said side plates.

7. The built-in strobe camera of claim 6, wherein at least one of said side plates is provided on its outer side face with a spring shaft.

8. The built-in strobe camera of claim 7, wherein said elastic biasing means comprises at least one torsion coil spring that is mounted to said spring shaft.

9. The built-in strobe camera of claim 8, wherein said torsion coil spring is engaged at a first end by said posture control pin and at a second end by at least an associated side plate or a body of said camera.

10. The built-in strobe camera of claim 9, wherein said at least one cam groove is substantially arched-shape, and wherein said spring shaft is located substantially at a center of curvature of an associated cam groove.

11. The built-in strobe camera of claim 10, wherein said supporting means comprises a prism receiving portion that is defined between said side plates.

12. The built-in strobe camera of claim 11, wherein said side plates are integrally formed with each other through said prism receiving portion.

13. The built-in strobe camera of claim 12, wherein said supporting means comprises a connecting arm which connects to said pivotable supportable arms.

14. The built-in strobe camera of claim 13, wherein said pivotable supporting arms are provided with shafts that are located adjacent to a connecting arm, and wherein said side plates are provided with shaft holes in which shafts of said supporting arms are rotatably fitted.

15. The built-in strobe camera of claim 14, wherein said pivotable supporting arms are provided on front ends thereof with said shaft holes, and wherein said light emitter is provided on side faces thereof with shafts which are rotatably fitted in said shaft holes of said supporting arms.

16. The built-in strobe camera of claim 15, wherein said supporting arms comprises parallel plates that are spaced apart from one another by a predetermined distance.

17. The built-in strobe camera of claim 16, wherein said pivotable supporting arms are provided on said front ends thereof with stepped portions on which shaft holes are formed and which are spaced apart from one another by a distance that is smaller than said predetermined distance of said supporting arms.

18. The built-in strobe camera of claim 1, further comprising, a detection switch that is turned ON and OFF when said light emitter is in and is not in said light emitting position, respectively, so as to detect a position of said light emitter.

19. The built-in strobe camera of claim 1, further comprising means for indicating various functions of said camera, means for illuminating said indicating means, and means for activating said illuminating means to illuminate said indicating means when said detection switch detects that said light emitter is in said light emitting position.

20. The built-in strobe camera of claim 1, wherein said means for elastically biasing comprises a spring that directly engages said posture control pin.

21. A camera having a built-in strobe in which a light emitter is moved between a retracted position and a light emitting position, comprising:
   at least one posture control pin that is provided on at least one side of said light emitter to project outward therefrom;
   means for supporting said light emitter, said supporting means including at least one cam groove in which said posture control pin is fitted to restrict a posture of said light emitter, said posture control pin projecting at one end thereof from said at least one cam groove;
   means for elastically biasing said light emitter, said biasing means acting directly on said projecting end of said posture control pin for biasing said light emitter into said light emitting position; and
   means for engaging said light emitter on said projecting end of said control posture control pin for restricting a movement at one end of said elastic biasing means in an axial direction of said posture control pin.

22. The built-in strobe camera of claim 21, wherein said engaging means comprising an engaging member that is integrally formed on said posture control pin.

23. The built-in strobe camera of claim 22, wherein said engaging member comprises an engaging projection that projects in a radial direction of said posture control pin.

24. The built-in strobe camera of claim 23, wherein said posture control pin and said engaging projection are shaped so that they can be inserted through said at least one cam groove at a specific angular position.

25. The built-in strobe camera of claim 21, wherein said elastic biasing means comprises a torsion coil spring which is engaged at a first end by said posture control pin.

26. The built-in strobe camera of claim 21, wherein said means for elastically biasing comprises a spring that directly engages said posture control pin.

27. A camera having a built-in strobe in which a light emitter is moved between a retracted position and a light emitting position, comprising:
   means for supporting said light emitter to move between said light emitting position and said retracted position, wherein said supporting means comprises an association member that includes a pair of supporting arms which are pivoted at a first end thereof to side faces of said light emitter and which are rotatably supported at a second end thereof; and a detection switch that is turned ON and OFF when said light emitter is in and is not in said light emitting position, respectively, so as to detect a position of said light emitter, wherein said detection switch comprises a switch pin that is movably mounted to a camera body to move in a direction that is parallel with an axis of said supporting arms, and a contact unit that has a movable contact and a stationary contact which are brought into contact with each other by a movement of said switch pin, wherein said movable contact abuts against one end of said switch pin, said switch pin is in slidable contact with a side face of one of said supporting arms to turn said detection switch OFF when said light emitter is in an intermediate position between said retracted position and a predetermined position immediately before said light emitting position, and said switch pin is separated from said side face of said supporting arms to turn said detection switch means ON when said light emitter is in said light emitting position.

28. The built-in strobe camera of claim 27, further comprising means for indicating various functions of said camera, means for illuminating said indicating means, and means for activating said illuminating means to illuminate said indicating means when said detection switch detects that said light emitter is in said light emitting position.

29. A camera that includes a strobe incorporated therein, in which a light emitter is moved between a retracted position and a light emitting position, and means for indicating various functions of said camera, comprising:

a detection switch that is turned ON and OFF when said light emitter is in and is not in said light emitting position, respectively, so as to detect a position of said light emitter, wherein said detection switch comprises a switch pin that is movably mounted to a camera body to move in a direction that is parallel with an axis of said supporting arms, and a contact unit that has a movable contact and a stationary contact which are brought into contact with each other by a movement of said switch pin, wherein said movable contact abuts against one end of said switch pin, said switch pin is in slidable contact with a side face of one of said supporting arms to turn said detection switch OFF when said light emitter is in an intermediate position between said retracted position and a predetermined position immediately before said light emitting position, and said switch pin is separated from said side face of said supporting arms to turn said detection switch means ON when said light emitter is in said light emitting position;

means for illuminating said indicating means; and means for activating said illuminating means to illuminate said indicating means when said detecting means detects that said light emitter is in said light emitting position.

* * * * *

UNITED STATES PATENT AND TRADEMARK OFFICE
CERTIFICATE OF CORRECTION

PATENT NO. : 5,245,374
DATED : September 14, 1993
INVENTOR(S) : T. HOSOKAWA, et al.

It is certified that error appears in the above-indentified patent and that said Letters Patent is hereby corrected as shown below:

At column 11, line 18 (claim 6, line 3) of the printed patent, change "sad" to ---said---.

Signed and Sealed this

Fifteenth Day of October, 1996

Attest:

BRUCE LEHMAN

Attesting Officer          Commissioner of Patents and Trademarks